May 24, 1938. W. C. ELLIS ET AL 2,118,179
TELEGRAPHONE
Filed March 27, 1936 2 Sheets-Sheet 1

INVENTORS W.C.ELLIS
E.S.GREINER
BY
G.M.Campbell
ATTORNEY

FIG. 2

INVENTORS: W. C. ELLIS
E. S. GREINER
BY
G. M. Campbell
ATTORNEY

Patented May 24, 1938

2,118,179

UNITED STATES PATENT OFFICE 2,118,179

TELEGRAPHONE

William C. Ellis, Lynbrook, N. Y., and Earl S. Greiner, East Orange, N. J., assignors to Bell Telephone Laboratories, Incorporated, New York, N. Y., a corporation of New York Application March 27, 1936, Serial No. 71,128

2 Claims. (Cl. 148—16)

This invention relates to magnetic telegraphones and particularly to an improved record member therefor and to a method of treating the member to improve its recording properties.

The object of the invention is to increase the efficiency and volume range capacity of telegraphone systems.

It is well known that when a telegraphone record member is subjected to the action of recording magnets carrying currents representing sound waves, the tape is variously magnetized in its successive elements and that when the tape so magnetized is passed between suitable reproducing magnets connected to a receiver, the original sounds are reproduced.

Among the qualities which make a magnetic tape or wire suitable for this purpose are a low noise level and the ability to respond to signal currents of large amplitude. As the amplitude of the currents applied to the recording magnets is increased, the amplitude of the signal recorded in the tape increases substantially linearly over a considerable range of current amplitudes but ultimately a point is reached at which no further increase in the signal strength can be obtained. This maximum value of the signal strength fixes the upper limit of the volume range of the tape as a record member. When a tape having no recorded signal is passed between the magnets of a reproducing system, more or less noise will be heard. A portion of this noise is due to the magnetic characteristics of the tape itself and the level of this inherent noise fixes the lower limit of the volume range of the tape. It will be understood, of course, that in practice the volume range actually used will be slightly less than the maximum value and that the proportion of the total range used will vary somewhat with the requirements of a particular case. Hence for purposes of comparison with other record members, it is convenient to speak of the maximum rather than the useful volume range of a member.

Heretofore probably the best record member available for such systems was a tape made by flattening carbon steel piano wire which after suitable heat treatment is capable of recording signals over a considerable range of amplitudes. Applicants have found, however, that chrome steel is much superior to carbon steel for this purpose and when such a chrome steel member is heat-treated according to this invention, it has a volume range more than 25 per cent greater than the range of the carbon steel member. The preferred tape steel from a volume range standpoint contains about 3.5 per cent chromium and about .8 per cent carbon.

The heat treatment comprises heating the tape to a suitable temperature in an inert atmosphere, quenching it in an inert atmosphere to a relatively low temperature and maintaining it at the quenched temperature for an appreciable time before permitting it to return to room temperature. The treatment is continuous, the tape being drawn through a furnace and a quenching head at a suitable speed and from the head through testing devices which give a continuous indication of the volume range of the treated tape. With this system the furnace and quenching head temperatures and the tape speed may be readily adjusted to give best results for the particular tape being treated.

The increased volume range of the chrome tape may be utilized to improve a telegraphone system either by raising the level of all of the signal components to increase the margin between the signal and the noise level of the member or by recording signals of a greater range of amplitudes. It is also found that this tape may be magnetized to a given value with a much lower input level than that necessary for prior tapes, which makes it possible to record speech at a practical level with an efficient carbon microphone without the use of an amplifier.

In the drawings Fig. 1 shows furnaces and a quenching head for continuous heat treatment of the tape in accordance with this invention;

Fig. 2 shows apparatus for measuring the volume range of the treated tape; and

Fig. 3 is a series of curves showing the effect of quenching temperature on the volume range of the treated tape.

Figure 1:
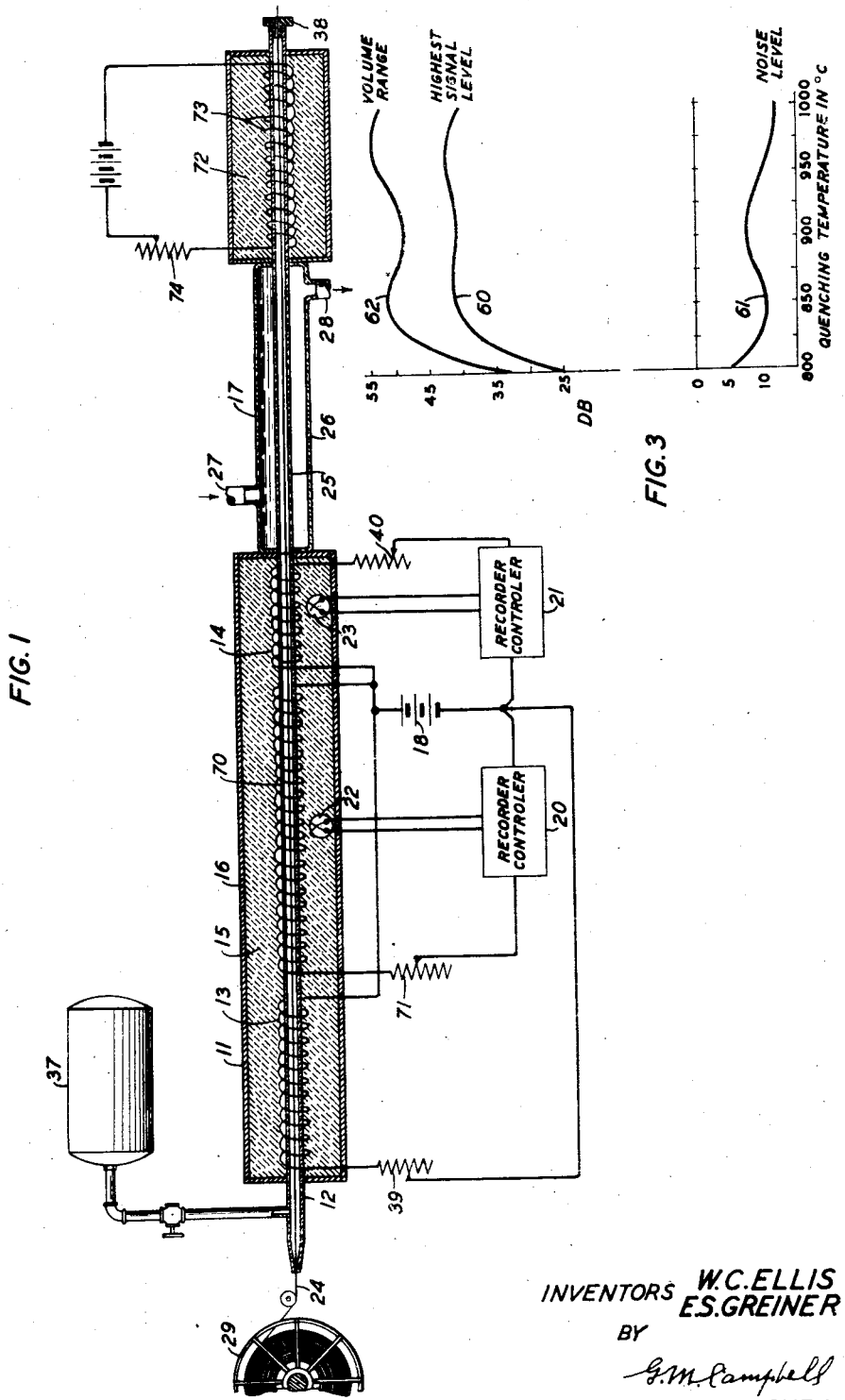

The heat treating furnace 11 comprises a long quartz tube 12 around which are wound resistance heating elements, and this assembly is suitably insulated against heat loss by refractory material 15 in the steel casing 16. In order to keep the temperature of the tape as it leaves the furnace to enter the quenching head 17 constant at the desired value during the time required for treating long lengths of tape at least two, and preferably three, independently controllable heating elements are required. In the furnace shown the three elements 13, 70, and 14 are all energized from a suitable source 18 in accordance with the settings of the rheostats 39, 71, and 40. In addition to these manual controls the elements 70 and 40 have automatic recorder controllers 20 and 21, respectively, which are of the well-known type which intermittently make and break the heating circuits under the control of the thermocouples 22 and 23 within the furnace to maintain the proper temperature.

The element 13 heats the incoming cold tape to a temperature somewhat below the required quenching temperature, the element 10 brings the tape up to very approximately the quenching temperature and the short element 14 provides any additional heat required to keep the tape leaving the furnace at constant quenching temperature. The quenching head 17 has a central tube 25 aligned with the quartz tube 12 of the furnace to form a continuous path for the tape and a jacket 26 surrounding the tube 25 and having an inlet 27 and an outlet 28 for the cooling medium which controls the temperature of the quenching atmosphere in the tube 25.

While the furnace and quenching head are effective in producing a tape which is satisfactory from volume range and noise level standpoints, a tape so treated may be too brittle. A tempering furnace 72 with a single heating element 73 and a controlling rheostat 74 may therefore be placed beyond the quenching head to reheat the tape to the temperature necessary to reduce the brittleness to a practical value without impairing its recording properties.

Figure 2:
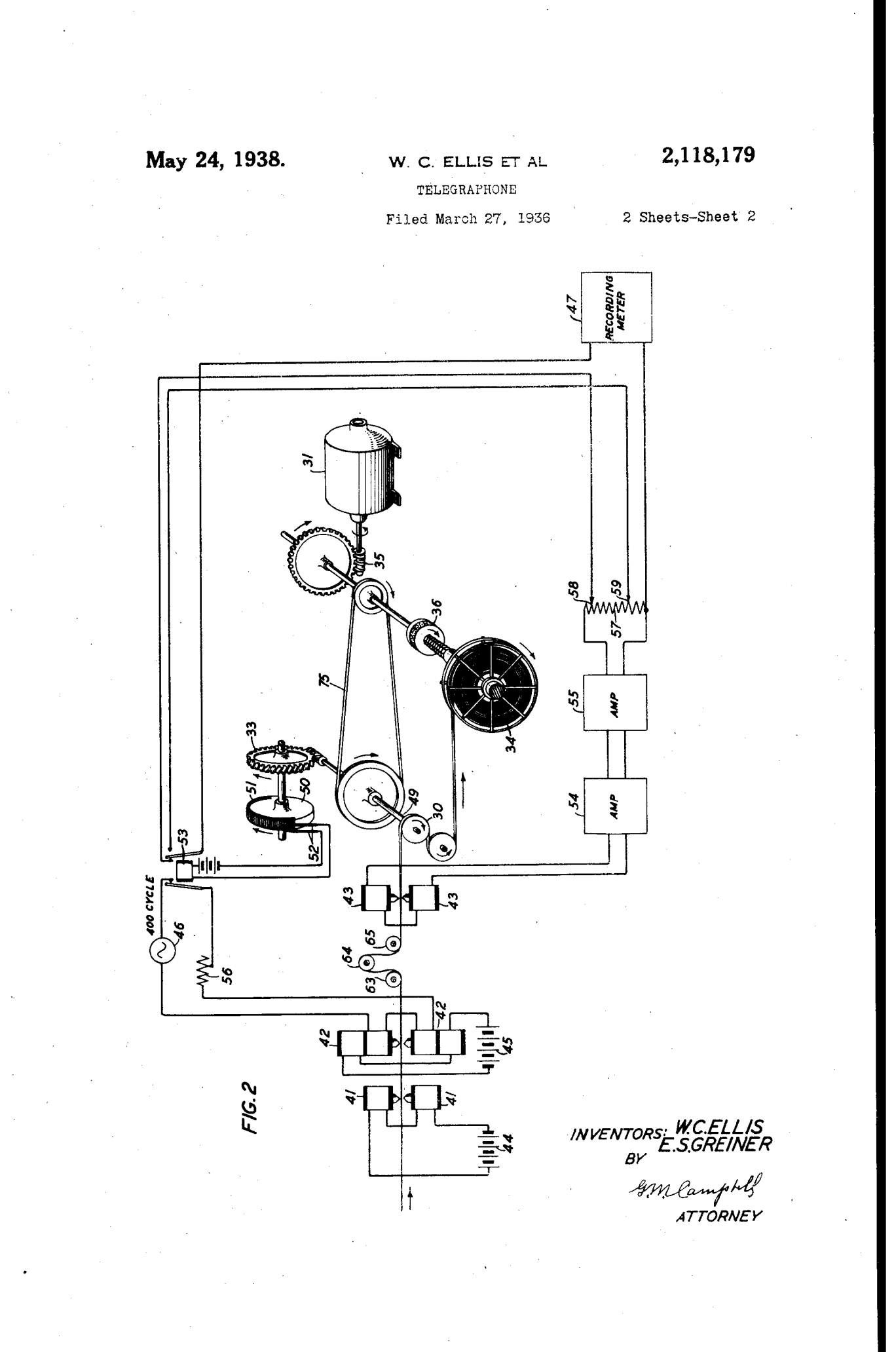

The tape to be treated is drawn from a feed reel 29 through the furnaces and quenching head at a suitable speed by a pulley 30 (Fig. 2) and wound up on the take-up reel 34. The pulley is driven by the motor 31 through the worm gearing 35 and the belt 75 which prevents the vibrations of the driving mechanism from reaching the tape. The reel 34 is connected to the drive through a friction clutch 36 which is adjusted to keep the tape wound up without subjecting it to excessive tension.

An inert atmosphere in the furnaces and quenching head is provided by feeding a suitable gas, such as nitrogen, under pressure from a tank 37 into the quartz tube 12 at the entrance to the furnace as shown. Excessive leakage is prevented at the furnace entrance by shaping the tube down to give only the necessary clearance for the tape and at the exit end of the tempering furnace by a plug 38.

It will be understood that the optimum tape speed will depend upon various factors such as the thickness of the tape and the lengths of the furnace and of the quenching head. It is found, however, for chrome steel tapes of the order of 1 or 2 mils in thickness that the furnace temperature should be from 850 to 1000° C. and that the tape should be quenched for about 7 seconds. In the system shown the furnace 11 is about five feet long, the quenching head is thirty inches long, and the tape is moved at about four inches per second. Circulating steam at 100° C. in the jacket 26 very quickly reduces the temperature of the hot tape and nitrogen from the furnace and maintains it at about 100° C. until it leaves the head. The tempering furnace 72 is about three feet long and is operated at a temperature of about 300° C.

In Fig. 3 curve 60 shows how the highest signal level varies with the temperature from which a 3.5 per cent chrome steel tape is quenched, curve 61 the variations in the noise level of the tape and curve 62 the total volume range. These curves are based on a 1000 cycle test frequency recorded on a chrome steel tape .002 inch thick, moving at twelve inches per second with polepieces having tip portions .002 inch thick.

As may be seen from curve 62, the volume range of a 3.5 per cent chrome steel tape is of the order of 50 decibels and is not greatly affected by variations in the temperature in the range of 850° C. to 1000° C., but the temperature used has a considerable effect on the stability of the volume range when the tape is stressed by handling and repeated playings. Idler pulleys 63, 64, and 65 are therefore provided to stress the tape between the recording and reproducing magnets to an extent at least as great as it is likely to be stressed in ordinary use, so that the volume range indicated by the meter 47 will be a more accurate measure of the permanent volume range of the tape. The furnace temperature is then adjusted to give the maximum stable range.

As the treated tape leaves the tempering furnace it passes successively between polarizing magnets 41, 41, the recording magnets 42, 42 and the reproducing magnets 43, 43. The polarizing magnets which are energized from the battery 44 bring the tape to a uniformly high magnetization and the battery 45 sets up a depolarizing flux in the magnets 42 to condition the tape to receive a signal as more fully explained in Patent 1,944,238 to C. N. Hickman, January 23, 1934.

In this case the signal recorded on the tape is merely for the purpose of testing its volume range capacity and may therefore consist of a single voice frequency such as 400 cycles per second derived from an oscillator 46. As pointed out above the volume range of the tape is the difference between the noise level and the level of the maximum signal which can be recorded. These levels may each be measured continuously but to avoid unnecessary duplication of apparatus they are preferably measured alternately for periods of a few seconds by a recording meter 47 of the well-known type which traces a line on a calibrated moving strip. The shaft 49 of the driving pulley 30 also drives the gear 33 and the wheel 50 which has one or more conducting segments 51 for connecting the brushes 52, 52 together to complete the circuit of the relay 53.

When the relay is unoperated no signal is applied to the tape and the reproducing magnets will deliver to the amplifiers 54, 55 a current representing only the noise inherent in the system. When the relay is operated as shown and the rheostat 56 is properly adjusted, the tape receives its maximum signal from the oscillator 46 and this signal is reproduced by the magnets 43. Due to the very great difference between the noise and signal levels, the resistor 57 in the output of the amplifier 55 is tapped at point 58 for noise measurement and at point 59 for signal measurement and the record strip of the meter 47 is preferably calibrated so that the noise and signal levels and the volume range can be read directly from the meter.

While the invention has been described with particular reference to 3.5 per cent chrome steel tape it will be understood that the apparatus and general method are also applicable to the heat treatment of other tapes and since the testing apparatus gives an immediate and continuous check on the volume range being obtained, the tape speed and furnace temperatures may be easily changed to suit the characteristics of any other tape.

What is claimed is:

1. The method of heat treating telegraphon record members which comprises drawing the member through an inert atmosphere of high temperature into and through an inert atmosphere of lower temperature, recording a signal on the member as it emerges from the atmosphere of lower temperature, reproducing the signal and adjusting the temperature of the high temperature atmosphere in accordance with the level of the reproduced signal to produce a member of the desired volume range.

2. The method according to the preceding claim in which the heat-treated member is stressed by bending before the signal is reproduced, to an extent at least as great as that produced by the normal use of the member in a telegraphone machine so that the volume range indicated will be the permanent volume range of the member.

WILLIAM C. ELLIS.
EARL S. GREINER.